(12) United States Patent
Tzonev et al.

(10) Patent No.: US 8,800,395 B2
(45) Date of Patent: Aug. 12, 2014

(54) APPARATUS FOR THE WIRELESS REMOTE MONITORING OF COVERED FLOATING STORAGE TANK ROOFS

(75) Inventors: Nikolay Nikolov Tzonev, Victoria (CA); Dale John Shpak, North Saanich (CA)

(73) Assignee: Syscor Controls & Automation Inc., Victoria, British Columbia (CA)

( * ) Notice: Subject to any disclaimer, the term of this patent is extended or adjusted under 35 U.S.C. 154(b) by 270 days.

(21) Appl. No.: 13/120,643

(22) PCT Filed: Sep. 21, 2009

(86) PCT No.: PCT/IB2009/054117
§ 371 (c)(1),
(2), (4) Date: Mar. 23, 2011

(87) PCT Pub. No.: WO2010/035201
PCT Pub. Date: Apr. 1, 2010

(65) Prior Publication Data
US 2011/0174399 A1 Jul. 21, 2011

Related U.S. Application Data

(60) Provisional application No. 61/194,005, filed on Sep. 24, 2008.

(51) Int. Cl.
*G01N 19/00* (2006.01)
(52) U.S. Cl.
USPC .......................................... 73/865.8

(58) Field of Classification Search
None
See application file for complete search history.

(56) References Cited

U.S. PATENT DOCUMENTS

| | | | | |
|---|---|---|---|---|
| 2,677,816 | A | * | 5/1954 | Quist .............................. 73/308 |
| 2,694,930 | A | * | 11/1954 | Adams et al. ................. 374/116 |
| 3,085,434 | A | * | 4/1963 | Orsinger et al. ................ 73/321 |
| 6,229,448 | B1 | * | 5/2001 | Bennett et al. ................ 340/618 |
| 2007/0205907 | A1 | * | 9/2007 | Schenk, Jr. .................... 340/623 |
| 2011/0063107 | A1 | * | 3/2011 | Tzonev et al. ........... 340/539.24 |
| 2012/0073367 | A1 | * | 3/2012 | Tzonev et al. .................. 73/305 |

FOREIGN PATENT DOCUMENTS

| | | | |
|---|---|---|---|
| JP | 363236914 | * | 10/1988 |
| JP | 1010283 | * | 4/1998 |
| JP | 2005215731 | * | 8/2005 |

* cited by examiner

*Primary Examiner* — Robert R Raevis
(74) *Attorney, Agent, or Firm* — Davis & Bujold, PLLC; Michael J. Bujold

(57) ABSTRACT

An apparatus for the wireless and remote monitoring of covered floating storage tanks monitors roof position, flexure, fires and the presence of vapors or liquids from water, hydrocarbons or other chemicals. The apparatus relies upon on one or more encapsulated intelligent sensor units and communication units. The sensors are deployed on the floating roof of a storage tank and the communication units are deployed near the top wall of the floating roof storage tank or on the fixed roof of the tank.

18 Claims, 5 Drawing Sheets

APPARATUS FOR THE WIRELESS REMOTE MONITORING OF COVERED FLOATING STORAGE TANK ROOFS

CROSS-REFERENCE TO RELATED APPLICATIONS

This application claims the benefit of U.S. Provisional Patent Application 61/194,005 filed with the USPTO on Sep. 24, 2008

The Inventors have filed a related application regarding uncovered floating storage tank roofs as disclosed in PCT Application PCT/CA2009/000388, filed on Mar. 24, 2009.

FIELD OF THE INVENTION

This invention relates to the remote monitoring of the floating roofs of large storage tanks, including tanks used for storing liquid petroleum products or other chemicals where the floating roof is covered by a roof that is fixed to the top of the tank. The invention is used to monitor roof position, flexure, and other conditions such as fires or the presence of vapors or liquids from water, hydrocarbons, or other chemicals. The invention can be connected to a monitoring system using wired or wireless means and can be used for routine status monitoring or for notifying plant operators in the event of alarm conditions. The invention can be completely self-contained and is suitable for encapsulation and use in harsh environments.

BACKGROUND OF THE INVENTION

Large storage tanks are often cylindrical and have a circular floating roof. The roof floats on the surface of the liquid, thereby decreasing the vapor space inside of the tank. A floating roof may be required for reasons of safety or for pollution reduction. The floating roof has a seal to seal it to the wall of the tank that helps to prevent the escape of the contained liquid or vapors from that liquid.

There are two broad types of storage tanks that utilize floating roofs: tanks having an exposed floating roof and tanks having a fixed roof covering the floating roof. An advantage of the covered tank is that it protects the floating roof from undesirable effects from the external environment, such as rain or birds. A disadvantage of the covered tank is that volatile, explosive, corrosive, or toxic gasses or liquids can accumulate between the floating roof and the fixed roof.

The floating roof is a large dynamic structure having a diameter of up to 100 meters and weighing several tons. This dynamic structure is subjected to changing forces from environmental conditions (temperature, wind, etc.) that affect the tank, the lid, or the contained liquid; convective forces within the liquid; or forces that occur when liquid is added or removed, including friction from the seal. The roof will flex and possibly tilt in response to these changes, which may result in the loss of the contained liquid or vapor into the space between the floating roof and the fixed roof. In extreme cases, the roof may tilt enough to cause it to sink into the tank.

The industry is therefore quite interested in monitoring systems that can be used to improve safety, reduce environmental concerns, or avoid major problems such as seal failure or a sunken roof.

There are existing patents that address the application of electronic monitoring or control to storage tank systems. For example, U.S. Pat. No. 4,596,266 (Kinghorn, et al., 1986) describes an electronic safety valve and system for controlling the roof drain on a hydrocarbon storage tanks for the purpose of allowing water drainage while preventing the escape of the contained liquid. U.S. Pat. No. 4,176,553 (Wood, 1979) describes a system for measuring the level of a liquid in a storage tank having a predetermined reference level. Although these patents are applied to storage tanks, they are essentially unrelated to the invention described herein. There is no existing art that addresses the roof monitoring system described herein.

U.S. Pat. No. 6,700,503 (Masar, et al. 2004) describes a means for wireless remote monitoring and graphically displaying the liquid level inside of a tank. The invention described herein does not incorporate a graphical display.

WIPO PCT filing 94/26627 (Christensen, 1994) describes a system for estimating the inclination of a storage tank roof by using float-based liquid level sensors and reed switches whereas the invention described herein uses solid-state micro electro-mechanical devices to directly measure inclination.

There is a considerable body of literature, standards, and patents that describe wireless sensor networks. A representative book that describes the current art is Protocols and Architectures for Wireless Sensor Networks by Karl Holger and Andreas Willig (Wiley, 2005).

U.S. Pat. No. 7,339,957 (Hitt, 2008) describes how transmission time slots are allocated to transmitting nodes in a system of wireless environmental sensors and actuators for the purpose of controlling irrigation systems. Although the invention described herein utilizes environmental sensors, it does use actuators nor does it rely upon a slotted communications protocol.

U.S. Pat. No. 7,386,352 (Davis, et al., 2008) describes a modular sensor network node architecture where the node architecture has each sensor coupled to its own small microprocessor so that it can be "plugged" into a sensor node containing a master microprocessor. The invention described herein is not modular and requires only a single microprocessor.

U.S. Pat. No. 7,468,661 (Petite et al. 2008) describes a system and method for monitoring and controlling remote devices. This patent describes variety of application areas but does not address storage tank monitoring. In its Detailed Description, this patent "describes the data structure of messages sent and received using the invention". Throughout its claims, the communications system requires a retransmission device (e.g., "one or more retransmitting receivers") or a "computer program that formats and stores select information for retrieval on demand". The invention described herein does not require any of these components.

BRIEF SUMMARY OF THE INVENTION

The present invention provides a new apparatus for monitoring floating tank roofs where the floating roof is covered by a fixed roof. The invention comprises one or more intelligent Sensor Units and one or more Communication Units. The Sensor Unit integrates multiple sensors into a self-contained unit that can be completely encapsulated for use in harsh environments. Additionally, any Unit may have a magnetic base for rapid installation on steel tank roofs. Each Communication Unit communicates with the Sensor Units and with a Monitoring System. The Communication Unit can be used to relay information from the Sensor Units to or from a Monitoring System and may contain a microprocessor for sensor fusion or for computing alarm conditions.

Each Sensor Unit incorporates a power source and communicates with the Communication Unit using a wireless communications link. Therefore, the Sensor Unit does not require any external wiring, thereby simplifying deployment and improving reliability. It may also be encapsulated, thereby further improving reliability. The Sensor Units may also communicate with each other, either to share information or to improve network reliability by providing alternate communication paths (e.g., mesh networking).

It is also possible to use radio-frequency power transmission or optical means to wirelessly provide power to the Units. Both of these methods are well-known in the existing art.

The Sensor Unit is comprised of several functional units including a microcontroller; a wireless communication module; an inclinometer or tilt sensor; and a liquid and/or vapor sensor (such as a hydrocarbon sensor). Any combination of other functional modules may be incorporated into any particular Sensor Unit: a temperature sensor; and a flame sensor.

There is no known existing apparatus that is similar to the current invention.

DETAILED DESCRIPTION OF THE INVENTION

Figure 1:
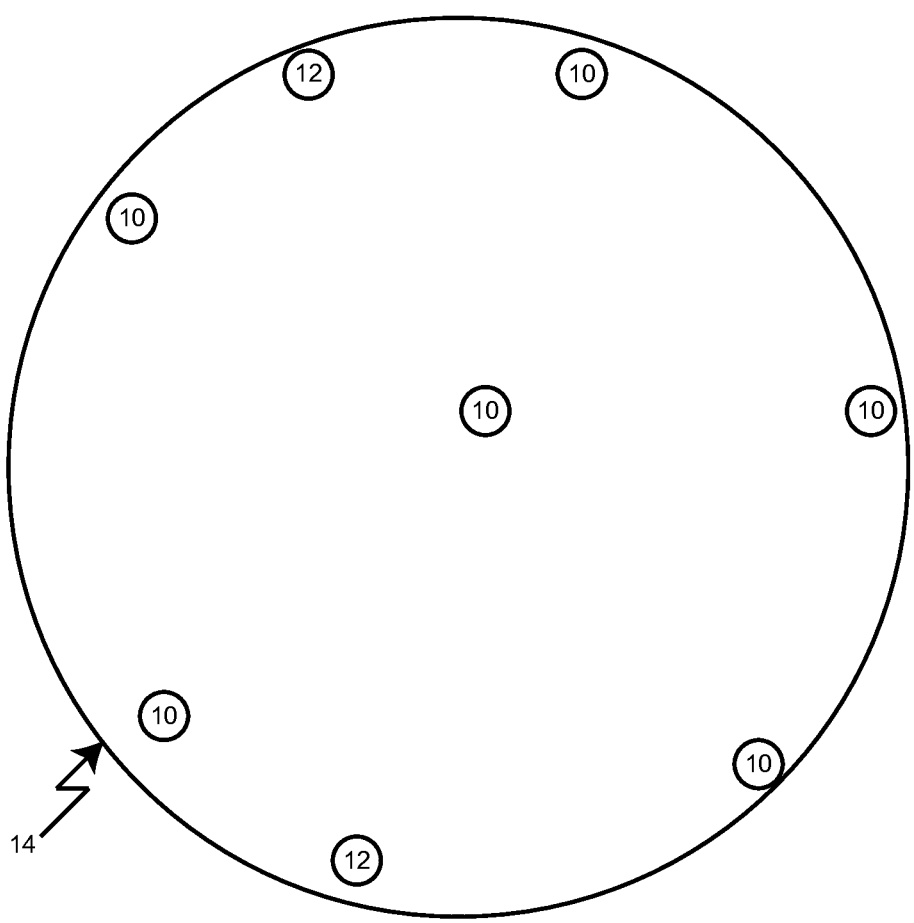
FIG. 1: Conceptual Plan View of the System Deployed on a Tank Roof

With reference to the conceptual plan view of a deployed system in FIG. 1, the invention consists of one or more encapsulated intelligent Sensor Units 10 and one or more Communication Units 12. The Sensor Units 10 are deployed on the floating roof of the tank whereas the Communication Units 12 are normally located near the top of the wall of the tank or on the fixed roof.

The Sensor Units 10 communicate with one or more Communication Units 12 via wireless means. As shown in FIG. 1, a plurality of Communication Units 12 can be employed, thereby adding redundancy to the system and improving the overall system reliability. Communication reliability can also be enhanced by allowing Sensor Units 10 to relay communications through other Sensor Units 10 (e.g., mesh networking).

Figure 2:
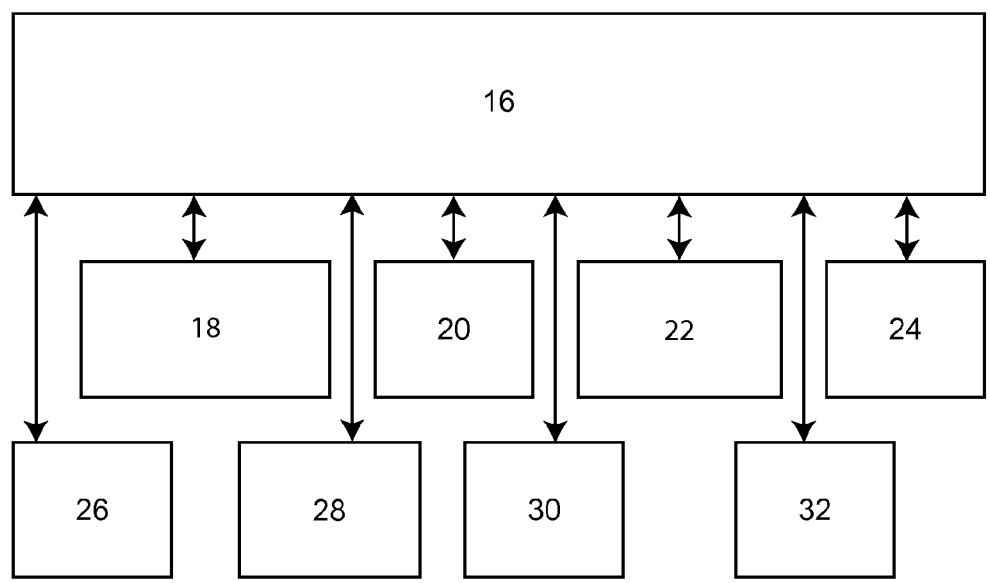
FIG. 2: Functional Block Diagram of the Sensor Unit

With reference to the functional block diagram in FIG. 2, said Sensor Unit 10 minimally comprises a power module 26 and the following core functional modules: a microcontroller 16; a communications module 18; an inclinometer or tilt sensor 28; and a liquid sensor 20 or vapor sensor 30. Optional functional modules that can be incorporated to enhance the utility of the Sensor Unit include: additional vapor 30 or liquid sensors 20; a pressure sensor 32; a temperature sensor 22; and a flame sensor 24.

Sensor Units 10 need not be functionally identical. For example, there may be a need for more tilt sensors 28 than flame sensors 24 for a particular deployment scenario.

With reference to FIG. 2, the connecting lines between the microcontroller 16 and the modules indicate communication links and are shown as being bidirectional but unidirectional connections are also possible. The communication link for the power module 26 is optional.

The Sensor Unit 10 is powered by a power module 26 employing batteries, photovoltaic cells, radio-frequency power transmission, optical power transmission, or any combination thereof. The Communication Unit 12 can be line powered, use power-over-ethernet, use batteries, use photovoltaic cells, or any combination thereof.

For the purpose of identifying each Sensor Unit 10, each Sensor Unit 10 is uniquely identified by one or more identification numbers: an electronic identification number that is set up during system configuration or a unique electronic identification number that is set up before system configuration. The identification number need not be globally unique: it can be unique to a particular deployment.

In the current embodiment, the Communication Unit 12 is comprised of a Texas Instruments MSP430 microcontroller; a Texas Instruments CG2520 communications module for communicating with the Sensor Units 10; a Cirrus Logic CS8900A Ethernet Controller; and a power module 26 that is connected to line power and contains a rechargeable battery pack as a secondary source of power. The Communication Unit 12 wirelessly communicates with the Sensor Units 10 and communicates with an external Monitoring System over ethernet. The Communication Unit 12 can be used to relay information to or from the Sensor Units 10 and to or from a Monitoring System.

The microprocessor 16 is programmable and can have software for supporting sensor fusion or for computing alarm conditions. Optionally, the microprocessor 16 can be re-programmed in the field by wired or wireless means.

For either the Communication Unit 12 or the Sensor Unit 10, the microcontroller and the communications module may be integrated into a single device such as the Freescale MC13224.

The Communication Unit 12 uses known technologies and is not described further.

The Sensor Unit 10 is preferentially encapsulated for use in harsh environments, including but not limited to chemical plants, petrochemical plants, and marine environments. The alternative to encapsulation is mechanical sealing systems, such as enclosures sealed with gaskets. The Sensor Unit 10 is preferentially weatherproof and immersible.

Preferentially, each Sensor Unit 10 incorporates a magnetic base 38 for rapid attachment to ferrous metal structures such as the floating lid of a storage tank. It may also be mounted using adhesives or mechanical means including fasteners or clamps.

In the current embodiment of the Sensor Unit 10, the core functional modules displayed in FIG. 2 are implemented using: a Texas Instruments MSP430 microcontroller; a Texas Instruments CC2520 communications module; an Analog Devices ADIS16209 digital inclinometer; and an ultrasonic liquid sensor that is described next.

Figure 3:
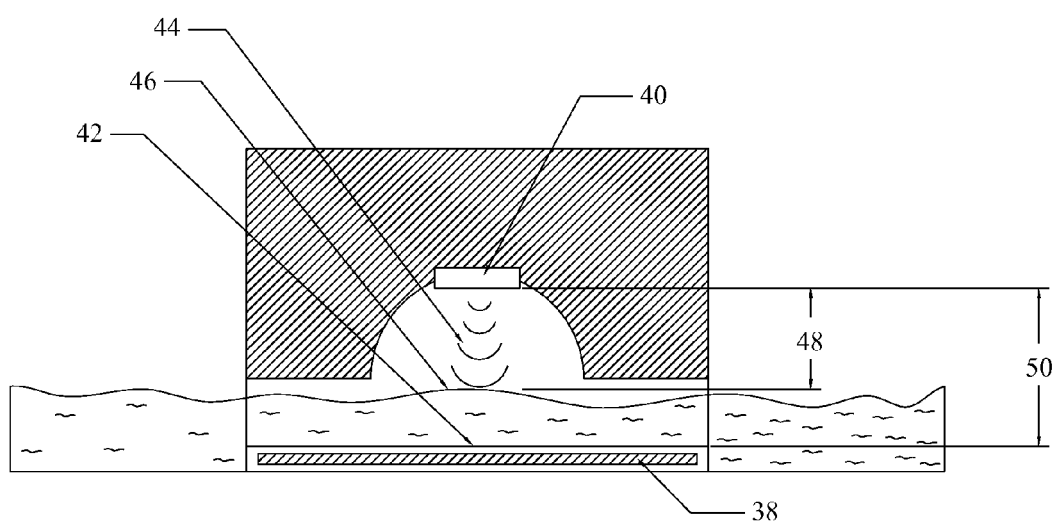
FIG. 3: Liquid Level Measurement Technique

With reference to FIG. 3, the preferred embodiment of the ultrasonic liquid sensor is comprised of an ultrasonic transducer 40; an electronics module for the transducer; and and an acoustically-reflective surface 42, which may be the surface of the tank roof. In response to a command signal from the microcontroller 16, the transducer 40 emits an acoustic pulse 44 toward said reflective surface 42 located at a known distance $d_2$ 50. The first reflection from said pulse 44 will be received by the transducer 40 after a propagation delay of $$t_S = \frac{2d_1}{v_A}$$

where $t_S$ is the round-trip propagation delay for the pulse; $d_1$ 48 is the distance to the surface 46 of the liquid; and $v_A$ is the velocity of acoustic propagation in the ambient atmosphere. Since we can use well-known methods to measure the propagation delay $t_S$, and we know the distance $d_2$ 50 and $v_A$, we can use this equation to accurately determine the depth ($d_2-d_1$) of the liquid. If $d_1$ is computed to be approximately equal to $d_2$, then no measurable amount of liquid is present.

The utility of the invention can be enhanced by additionally considering a second reflection due to the acoustic pulse being reflected by the acoustically-reflective surface 42. The round-trip propagation delay, $t_2$, of said second pulse is given by $$t_2 = \frac{2d_1}{v_A} + \frac{2(d_2 - d_1)}{v_L}$$

where $v_L$ is the velocity of acoustic propagation in the liquid. Since we can use the previous equation (for $t_S$) to determine $d_1$ 48 and we know $v_A$ and $d_2$ 50, we can use this new equation to determine $v_L$. In many practical application areas, such as the storage of petrochemicals, $v_L$ can be used to determine if the liquid that is detected by the liquid sensor is the stored liquid, water, or a combination thereof. This type of liquid sensor and the techniques and the specific components required for its implementation are known in the existing state of the art.

The current embodiment of the Sensor Unit 10 includes the following optional sensor modules: an c2v Technologies IR603 hydrocarbon vapor sensor; a Texas Instruments TMP275 temperature sensor; and a General Monitors FL4000 Multi-Spectral Infrared Flame Detector.

Since the Sensor Unit 10 is designed to be immersible, the vapor sensor should be protected from contact with possibly damaging liquids. With reference to the conceptual cross-sectional diagram in FIG. 4, this is accomplished by placing the vapor sensor 52 inside of a hollow channel or dome. As the liquid level rises into said channel 54, the atmospheric pressure inside of the channel 54 increases. As shown in FIG. 5, this increase in atmospheric pressure in the entrained atmosphere 60 prevents the liquid from rising into the channel 54 far enough to reach the vapor sensor 52.

Figure 4:
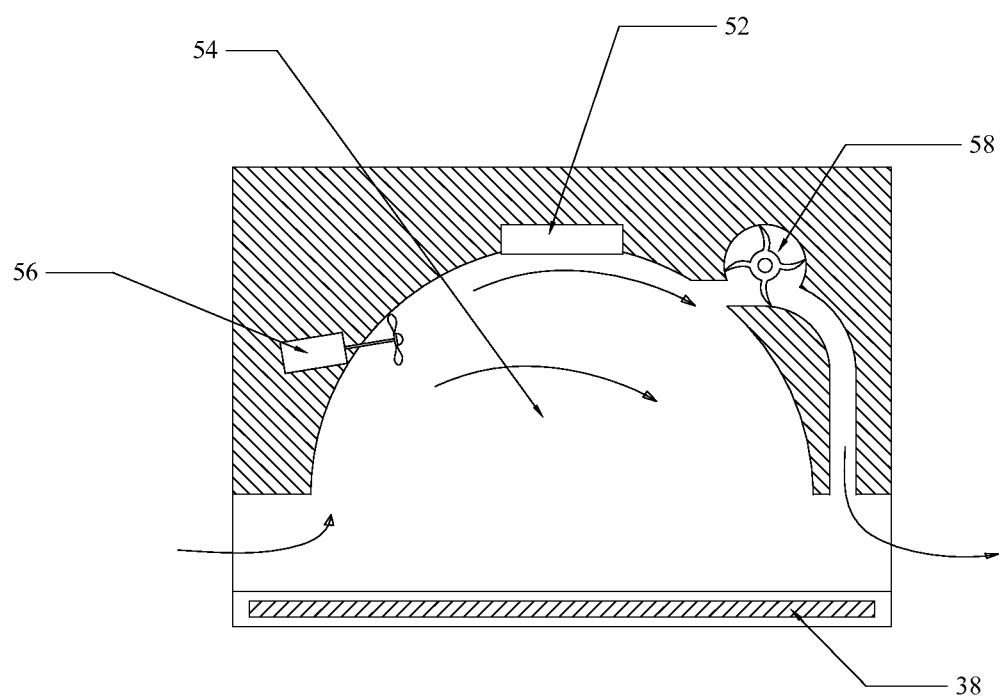
FIG. 4: Use of a Channel to Protect the Vapor Sensor from Immersion
Figure 5:
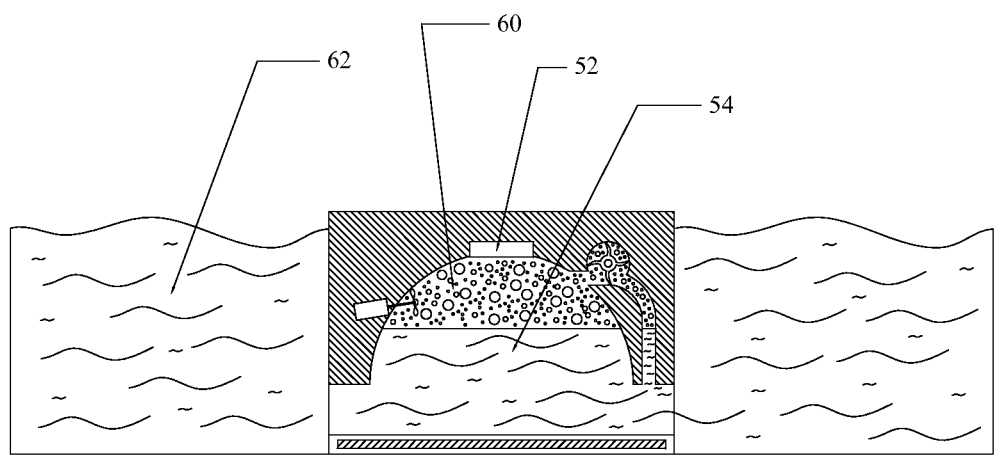
FIG. 5: Submerged Sensor Unit

With reference to FIG. 4, the channel 54 preferentially contains a means, such as a rotary or piezoelectric fan 56 or a pump 58, for circulating the ambient atmosphere across the surface of the vapor sensor 52. The operation of said circulation device is controlled by the microcontroller 16. In FIG. 4, the conceptual flow of atmosphere is indicated by curved arrows.

Communications among the system components (the Sensor Units 10, the Communication Units 12, and the Monitoring System) may be initiated using one or more of the methods described in the following four paragraphs. In all cases, communications between any Sensor Unit 10 and the Monitoring System must pass through one or more Communication Units 12.

The Monitoring System can send a request to one or more Sensor Units 10. The Sensor Units 10 will subsequently reply with the requested information. This type of communications is referred to as polling.

The Sensor Units 10 can send periodic status messages to the Monitoring System. These periodic messages can contain information from the sensors; alarm status; and/or information regarding the state of the Sensor Unit 10, such as battery condition. This type of communications is referred to as periodic.

The Sensor Units 10 can send messages to the Monitoring System in the event that an alarm condition has been detected by one or more Sensor Units 10. This type of communication is referred to as event-driven.

The Sensor Units 10 can communicate with each other to exchange sensor status and/or they can act as communications relays to improve the reliability or the range of the wireless communication system. This type of communication is referred to as local.

Communications between the Sensor Units 10 and/or Communication Units 12 can use mesh networking protocols to improve reliability.

This invention can be used to address critical concerns in industrial applications. Notably, government regulation in the petroleum industry requires the industry to comply with stringent safety and emissions standards. This invention can be used not only for monitoring the sensor readings and generating alarm signals but also for monitoring vapors at discrete locations in the tank and calculating total tank emissions (incorporating temperature and pressure data) for the purpose of government reporting and deciding on when to replace the seals.

Although the description above contains much specificity, these should not be construed as limiting the scope of the invention bet as merely providing illustrations of the presently preferred embodiment of this invention. Thus the scope of the invention should be determined by the appended claims and their legal equivalents.

What is claimed is:

1. A system for monitoring a state of a covered floating storage tank roof where said system requires no external wiring, the system comprising in combination:
   the floating storage tank roof which floats upon liquid in a storage tank;
   at least one sensor including a tilt sensor that is positioned on the floating storage tank roof to measure a local inclination of the floating storage tank roof;
   a microcontroller that monitors a status of at least one sensor including the tilt sensor; and
   a wireless communication module for relaying data from the microcontroller to one or more supervisory communication units,
   wherein the wireless communication module sends information from the microcontroller to the one or more supervisory communication units whenever the microcontroller determines that an alarm condition has been detected by the at least one sensor.

2. The system of claim 1, wherein the at least one sensor further includes, in addition to the tilt sensor, a liquid sensor used to measure a level of liquid accumulation on the floating storage tank roof in combination with the inclination of the floating storage tank roof.

3. The system of claim 2, wherein said liquid sensor uses ultrasonic time-of-flight information and the microcontroller computes both a depth and acoustic velocity for any liquid that is present.

4. The system of claim 1, further comprising at least one temperature sensor in communication with the microcontroller, the at least one temperature sensor measuring an ambient temperature on or near the floating storage tank roof.

5. The system of claim 1, wherein wireless communication between the wireless communication module and the one or more communication units is bidirectional.

6. The system of claim 1, wherein the at least one sensor, the microcontroller and the wireless communication module are assembled to form a sensor unit and system power is provided using photovoltaic cells that are physically attached to the sensor unit.

7. The system of claim 1, wherein the at least one sensor, the microcontroller and the wireless communication module are assembled to form a sensor unit and system power is provided using radio-frequency power transmission.

8. The system of claim 1, wherein the at least one sensor, the microcontroller and the wireless communication module are assembled to form a sensor unit and system power is provided using batteries contained within the sensor unit.

9. The system of claim 1, wherein the at least one sensor, the microcontroller and the wireless communication module are assembled to form a sensor unit and a magnetic attachment assembly is provided for attaching the sensor unit to the floating storage tank roof.

10. The system of claim 1, wherein the at least one sensor, the microcontroller and the wireless communication module are assembled to form a sensor unit and the sensor unit is encapsulated or mechanically sealed to protect the sensor unit from its external environment.

11. The system of claim 10, comprising more than one sensor unit in wireless communication with each of the one or more supervisory communication units.

12. The system of claim 11, wherein the sensor units are wirelessly interconnected using a mesh networking topology to improve communications reliability.

13. The system of claim 11, wherein a polling protocol is used by the one or more communication units to request information from each of the more than one sensor units.

14. The system of claim 1, wherein the wireless communication module periodically sends information from the microcontroller to the one or more supervisory communication units, 15. The system of claim 1, wherein the alarm condition of the at least one tilt sensor is triggered by an inclination of the floating storage tank roof being sensed.

16. The system of claim 1, wherein the at least one tilt sensor, the microcontroller and the wireless communication module are assembled to form a sensor unit and the sensor unit is encapsulated or mechanically sealed to protect the sensor unit from its external environment, a vapor sensor is provided, in the Sensor Unit, and the vapor sensor is protected from immersion by placing the vapor sensor within a physical channel within the sensor unit.

17. The system of claim 16, wherein the vapor sensor is a hydrocarbon vapor sensor.

18. The system of claim 16, further comprising a fan or a pump to circulate ambient vapors across the vapor sensor.

* * * * *